United States Patent
Plahn et al.

(10) Patent No.: US 8,684,338 B2
(45) Date of Patent: Apr. 1, 2014

(54) ACTIVE CONTROL OF TORSIONAL VIBRATION FROM AN ENGINE DRIVEN GENERATOR SET

(75) Inventors: Paul H. Plahn, Lino Lakes, MN (US); John Hughes, Andover, MN (US); Elias Ayana, Minneapolis, MN (US); Krzysztof Wejrzanowski, Stamford (GB); Abdeslam Mebarki, Stamford (GB)

(73) Assignee: Cummins Power Generation, Inc., Minneapolis, MN (US)

( * ) Notice: Subject to any disclaimer, the term of this patent is extended or adjusted under 35 U.S.C. 154(b) by 1596 days.

(21) Appl. No.: 12/212,376

(22) Filed: Sep. 17, 2008

(65) Prior Publication Data

US 2009/0091069 A1    Apr. 9, 2009

Related U.S. Application Data

(60) Provisional application No. 60/994,109, filed on Sep. 17, 2007.

(51) Int. Cl.
F02B 75/06    (2006.01)

(52) U.S. Cl.
USPC ....................................... 267/136; 123/192.1

(58) Field of Classification Search
USPC .......... 123/192.1–192.2; 267/140.14, 140.15, 267/136; 188/380
See application file for complete search history.

(56) References Cited

U.S. PATENT DOCUMENTS

| | | | | |
|---|---|---|---|---|
| 4,922,869 A * | 5/1990 | Kadomukai et al. | ........ | 123/192.1 |
| 5,020,491 A * | 6/1991 | Mashino | .................... | 123/192.1 |
| 5,109,815 A * | 5/1992 | Maeda et al. | .............. | 123/192.1 |
| 6,405,701 B1 * | 6/2002 | Masberg et al. | ........... | 123/192.1 |
| 7,406,939 B2 * | 8/2008 | Asahara et al. | ............ | 123/192.1 |

FOREIGN PATENT DOCUMENTS

| | | |
|---|---|---|
| JP | 3-178599 | 8/1991 |
| KR | 10-1999-0044294 | 6/1999 |

OTHER PUBLICATIONS

Zaremba, et al., "Control Design for Active Engine Damping using a Starter/Alternator", Proceedings of the American Control Conference, pp. 2043-2047, Jun. 2000.
Nakajima, et al., "A study on the reduction of crankshaft rotational vibration velocity by using a motor-generator", JSAE Review 21 (2000) pp. 335-341.
International Search Report issued for PCT/US2008/076672 and mailed Apr. 8, 2009.

* cited by examiner

*Primary Examiner* — Christopher Schwartz
(74) *Attorney, Agent, or Firm* — Foley & Lardner LLP

(57) ABSTRACT

An active torque cancellation system is provided. The system includes a generator set having a combustion engine and mounted to an application structure. The system also includes an active power management module coupled to the engine which actively reduces vibrations in the application structure.

22 Claims, 6 Drawing Sheets

Torque Diagram for an engine without counter rotating weight balancing shafts

Simulated cylinder torque of a single cylinder 10 HP gasoline engine at 3600 RPM, average torque 14.6 ft-lbs, peak torque 280 ft-lbs

ACTIVE CONTROL OF TORSIONAL VIBRATION FROM AN ENGINE DRIVEN GENERATOR SET

This application claims the benefit of U.S. Provisional Patent Application Ser. No. 60/994,109, filed Sep. 17, 2007, which is entitled "Active Control of Generator set Torsional Vibration" and is herewith incorporated by reference in its entirety.

FIELD

The embodiments herein generally pertains to the field of power generation, and more particularly to actively reducing vibrations caused by engine driven generator sets.

BACKGROUND

Engine driven generator sets are used for a wide variety of purposes. Those which operate using a combustion engine as the power source are prone to vibrations associated with the impulse stroke of the engine. FIG. 1 illustrates this initial torsional impulse due to cylinder firing during the operating cycle of a typical single cylinder four cycle engine operating at full load. The peak torque generated by the engine is about 18 times the average torque over the engines' rotational crank cycle of 720 degrees.

A typical engine driven generator set 200 housed within a housing 205 is illustrated in FIG. 2. The housing 205 is mounted to an application structure 207 using mounts 209. In some embodiments, the mounts 209 are soft mounts (such as springs, rubber mounts, etc.), and in other embodiments the mounts 209 allow for the housing 205 to be rigidly mounted to the application structure 207. The application structure 207 can be any structure a generator set could be mounted to such as, for example, a vehicle (i.e. car, boat, RV, etc.) or the ground.

The generator set 200 can be either a fixed speed generator set or a variable speed generator set. The engine driven generator set 200 includes an engine component 210 coupled to a flywheel 215 and has rubber mounts 212 that mount the engine component 210 to the housing 205. The flywheel 215 is typically used to smooth the rotational speed variations of an engine by storing the engines power stoke energy in the rotational inertia of a large generally cylindrically shaped mass and releasing that energy until the next power stroke. The generator set 200 typically also contains a machine 220 which converts the rotational energy of the engine and flywheel 215 into electricity and vice versa. In some embodiments the machine 220 is mounted to the flywheel 215. The generator set 200 also includes a rectifier 225 coupled to the machine 220, DC filters 230 coupled to the rectifier 225, and a direct current to alternating current (DC to AC) inverter 235 coupled to the DC filters 230. The alternating current (AC) produced by the machine 220 then is rectified to direct current (DC) by the rectifier 225 and runs through the DC filters 230 which provide a more uniform voltage output, and the DC to AC inverter 235.

Even though the flywheel minimizes rotational speed variations, it does not address the induced torque of the cylinder block and its transmitted vibration through vibration isolation mounts to the final application structure. The transmitted vibration is particularly high at low engine speeds when single and twin cylinder engines are used. It is desirable to operate at low speed to minimize noise levels, and even while operating at zero load, at low speeds vibration is a significant problem.

In addition to input power induced vibrations, the level of vibration in a generator set is also a function of the amount of load or power draw from the generator's stator. Consequently the amplitude and frequency of the resultant vibration is both a function of engine speed and power draw from the generator set. In current practice, the machine draws a torque from the engine crankshaft independent of when the torque is produced in the engine.

Also, traditional four-cycle combustion engines, whether using spark or compression ignitions, develop power in pulses. These power pulses can span more than ten times the engine's average output power and cause the application structure holding the engine to roll back and forth. Typically, these engines are softly mounted so only a fraction of these pulsations are transmitted to the application structure.

In addition, some engines utilize internal rotating counter-balancing shafts to help offset the imbalances of the crankshaft and piston, and these imbalances produce additional couples and periodic rotational vibrations.

The resultant vibrational problems have been primarily dealt with by placing the generator set on elastic mounts which serve to isolate the generator set vibrations from the application structure. Such mounts, however, do not effectively address the severe vibrational levels which can occur, especially during low engine rotational speeds and while large current draws are taken from the generator set.

What is needed is a generator set which can produce power without the vibration issues associated with systems, even when operating at low speeds or while operating under large power draw conditions.

The present disclosure discloses a generator set which solves many of the problems associated with existing generator sets. It will be appreciated that the disclosure may disclose more than one embodiment. The embodiments are pointed out with particularity in the claims annexed hereto and forming a part hereof.

BRIEF SUMMARY

The embodiments described herein generally relate to power generation systems providing a reduction in torsional vibrations which occur as the combined result of power additions and power draws from the power system, as well as torsional vibrations produced by internal mechanical balance mechanisms within the engine. In particular, the embodiments herein relate to the active reduction of vibration in an application structure that stores generator sets.

In some engine powered product installations low levels of transmitted forces or vibrations are a desirable product characteristic. Embodiments described herein provide active torque cancellation systems to be applied to the engine powered product that keep large alternating torques internal to the engine driven product. By doing so, the generator's housing rolls less, which reduces the alternating loads that are transmitted into the application structure. These transmitted forces are directly related to the engine powered product's alternating displacements, which tend to increase at lower frequencies. Accordingly, much of the transmitted force reduction offered by the active torque cancellation system occurs by reducing the system's lower frequency motions.

Embodiments of the active torque cancellation system described herein involve an energy storage system that transfers energy to and from the product's rotational system as a function of the rotational system's angular position, where the lowest torsional resonant frequency of the torsional connection between the engine and its driven component is higher in frequency than the highest torsional frequency being reduced.

One advantage of the embodiments described herein is to greatly reduce the level of vibration in generator sets, and thereby reduce the level of vibration in the generator set housing and consequently the application structure that mounts the generator set. This reduces both system noise as a result of being able to operate at lower speeds with low vibration, as well as the level of fatigue system components experience, producing quieter generator sets whose useful lifetime is extended.

The embodiments are pointed out with particularity in the claims annexed hereto and forming a part hereof.

DETAILED DESCRIPTION

Figure 1:
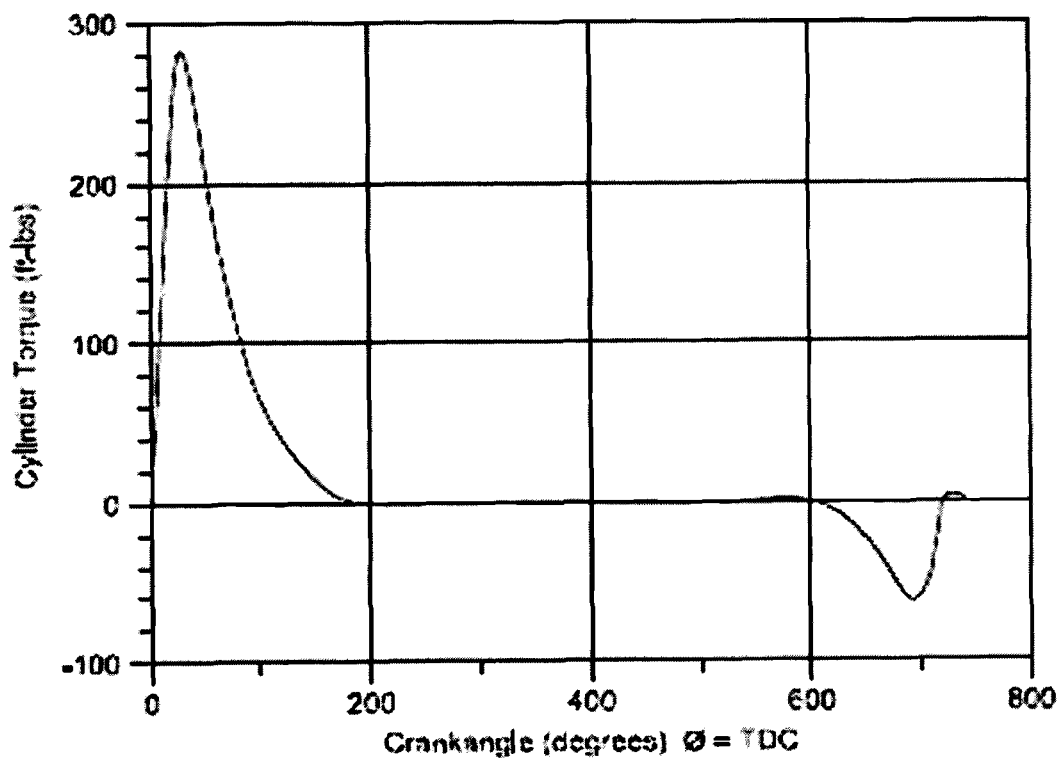
FIG. 1 is an illustration of the torque due to engine cylinder firing during the operating cycle of a typical single cylinder four cycle engine operating at full load.
Figure 2:
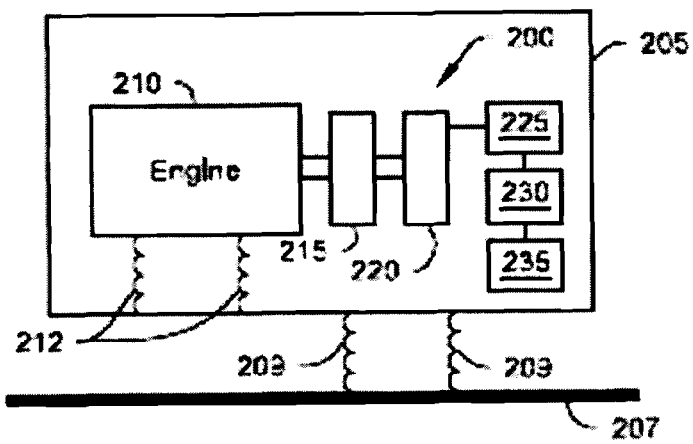
FIG. 2 is a prior art schematic of a typical generator set, showing its major components.
Figure 3:
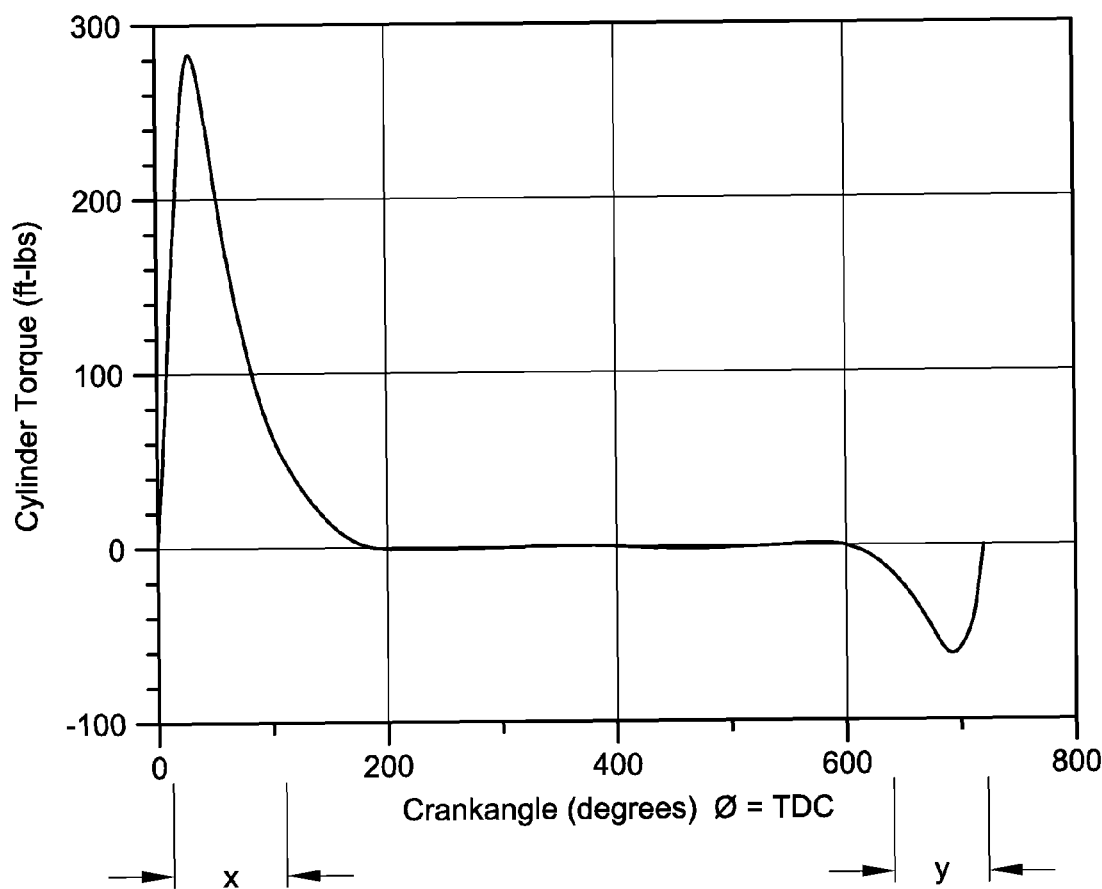
FIG. 3 is an illustration of the torque due to engine cylinder firing during the operating cycle of a typical single cylinder four cycle engine operating at full load showing the region where the machine torque is offsetting the torque produced by the cylinder firing (Any torque effects due to internal rotating counterbalancing shafts are neglected in this figure).

Combustion engines obtain their power from the chemical combustion of fuels which produce heat and gases that propel an engine piston along the axis of the engine cylinder. The piston is connected to the crankshaft where the linear force is converted to torque. This torque can come from one or more of the following sources: a cylinder pressure variation, a slider-crank motion, a counter rotating balance shaft, etc. FIG. 3 illustrates the torque produced and consumed during the operating cycle of a typical single cylinder engine operating at full load (Any torque effects due to internal rotating counterbalancing shafts are neglected in this figure). As shown in FIG. 3, In practice, many single cylinder engines incorporate counter rotating balance shafts which can also cause a noticeable periodic torque reaction that causes vibration.) The engine torque typically drives a flywheel, a large generally cylindrically shaped mass whose large rotational inertia helps absorb the uneven torque supplied by the cylinder. In the case of electrical generator sets, the torque from the flywheel drives a rotor housed within a machine to convert the mechanical energy into electrical energy in the machine. In the embodiments described herein, the machine is a bi-directional machine that is capable of both generating power and absorbing power. The electrical energy created by the stator is alternating current (AC) whose frequency (ν) is related to engine revolutions per minute (rpm) by the following formula:

$$\nu(Hz) = (\#rpm * \#pole\ pairs\ in\ 1\ rev\ of\ stator)/(60\ sec/min)$$

Figure 7A:
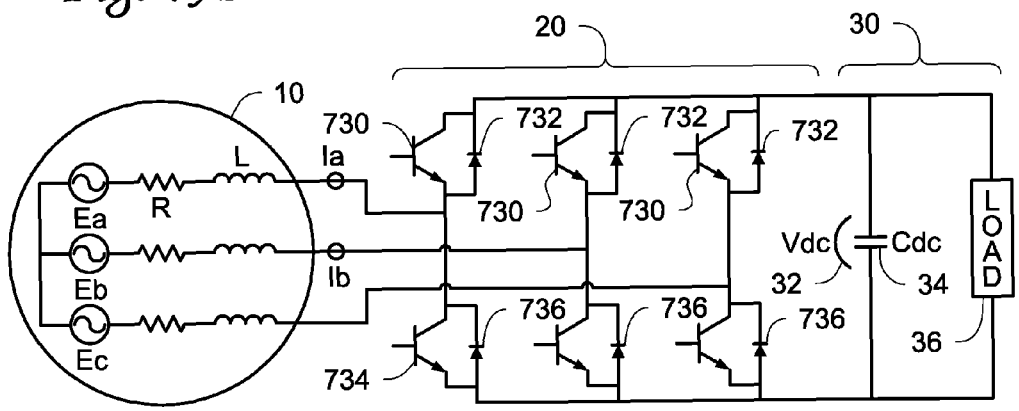
FIGS. 7a-7c show block diagrams of three power electronics topologies used for the active torque cancellation.
Figure 7B:
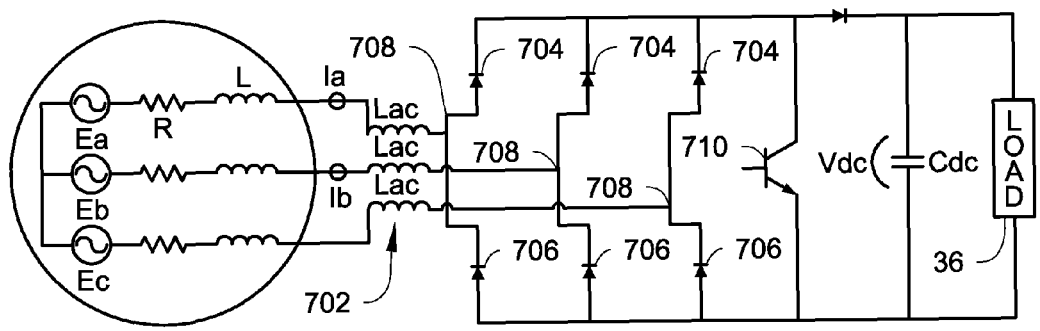
Figure 7C:
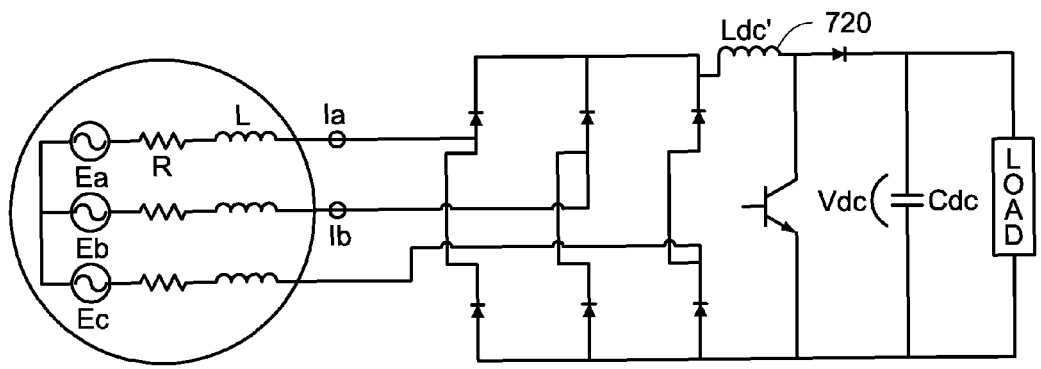

Typically for a 16 pole system, the engine is run in the 1400-2600 rpm range producing AC current in the 187-347 Hz range. This AC current is then converted into direct current (DC) through either a unidirectional rectifier circuit as shown in FIGS. 7b and 7c or through a bidirectional circuit as shown in FIG. 7a.

Normally, although a flywheel helps even out the torque (or speed irregularity) of the system, at low engine speeds and large applied loads, a significant amount of vibration can develop within the system. Vibrations within three-dimensional systems are characterized typically as having 6 components—3 translational (orthogonal) components (x, y, and z), and 3 rotational (each roll vibration is about each of the orthogonal axes, respectively). The rotational vibration which is about the driveshaft/flywheel axis is usually the largest component of the overall vibration. Consequently, reducing this component of vibration is one of the objectives of the embodiments described herein.

When the instantaneous torque generated by the piston of the engine is substantially offset by the machine's absorption of that torque in the same magnitude and crank angle during the operating cycle, then no angular acceleration or deceleration of the flywheel takes place due to the engine cylinder firing, and there is no net rotational torque (or vibration) of the generator set about this axis. The result is that little perceived change in generator set vibration is observed between no load and full load conditions.

Figure 4A:
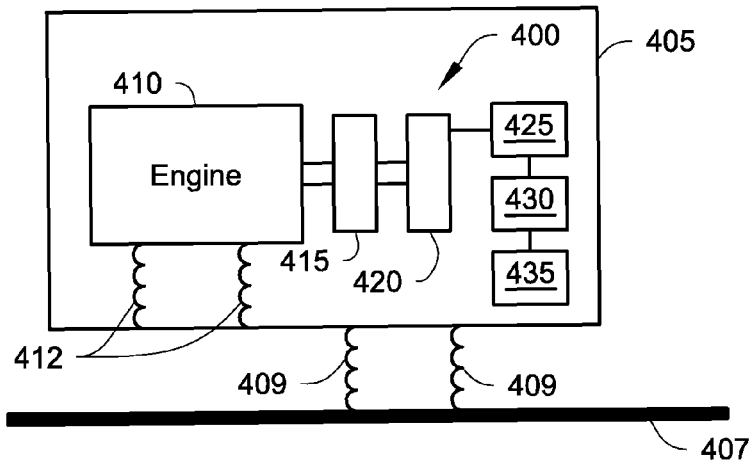
FIGS. 4a and 4b are schematics of generator sets having active power management such as pulse width modulation (PWM) switching dependent upon crankshaft angle and load demand.
Figure 4B:
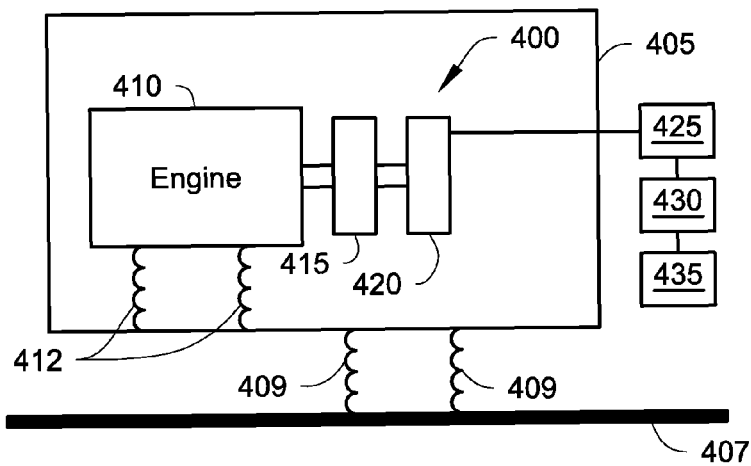

FIGS. 4a and 4b show schematics of a generator set 400 housed within a housing 405 having active power management dependent upon crankshaft angle and load demand, according to one embodiment. The housing 405 is rigidly mounted to an application structure 407 using mounts 409. The application structure 407 can be any structure a generator set could be mounted to such as, for example, a vehicle (i.e. car, boat, RV, etc.) or the ground.

The generator set 400 includes an engine component 410 coupled to a flywheel 415 and has rubber mounts 412 that mount the engine component 410 to the housing 405 and a machine 420. The generator set 400 also includes an active power management unit 425, DC filters 430 and an inverter 435. As shown in FIG. 4b, in some embodiments, the active power management unit 425, the DC filters 430 and the inverter 435 can be located outside the housing 405. The flywheel 415 is typically used to smooth the rotational speed variations of an engine by storing the engines power stroke energy in the rotational inertia of a large generally cylindrically shaped mass. The machine 420 converts the rotational energy of the flywheel into electricity and vice versa. In some embodiments, the machine 420 is mounted to the flywheel 415. The alternating current (AC) produced is then adjusted to provide a reverse torque to the machine 420 and reduce vibrations using the active power management unit 425. The adjusted AC current then allows mechanical or electrical power, depending on the engine cycle, to flow back and forth between the flywheel 415 and the DC filters 420 through the machine 420. The machine 420 can offset torque vibrations produced during the power stroke by absorbing torque and during the compression stroke by producing torque in the machine 420. As shown in FIG. 3, region x identifies where the machine torque can offset the torque produced by the cylinder power stroke and region y identifies where the machine torque can offset the torque absorbed by the cylinder compression cycle.

Figure 5:
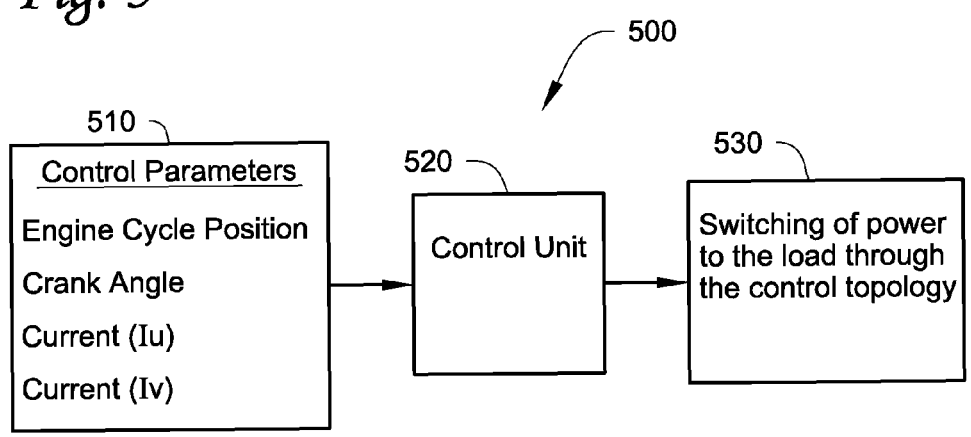
FIG. 5 is a flow diagram which generally shows the process by which load switching occurs.

FIG. 5 is a flow diagram showing the general control processes 500 which are utilized to minimize the vibration. At 510, sensors sense where in the engine cycle the engine is at, (i.e. a CAM marker or any other sensor that gives an indicator once per two revolutions of the engine crankshaft), the instantaneous crank angle position, the current produced in 2 of the 3 phases of electricity in the stator Iu, Iv, and the electric load or bus voltage Vdc. A number of sensors, including but not limited to a cam angle sensor, a nitrogen-oxide emission sensor, a noise sensor, a torque sensor, a gas sensor (i.e., ignition or manifold pressure sensor), a cylinder pressure sensor, or an angular accelerometer sensor, may be used either alone or in combination to determine where in the engine cycle the engine currently is at.

Figure 6:
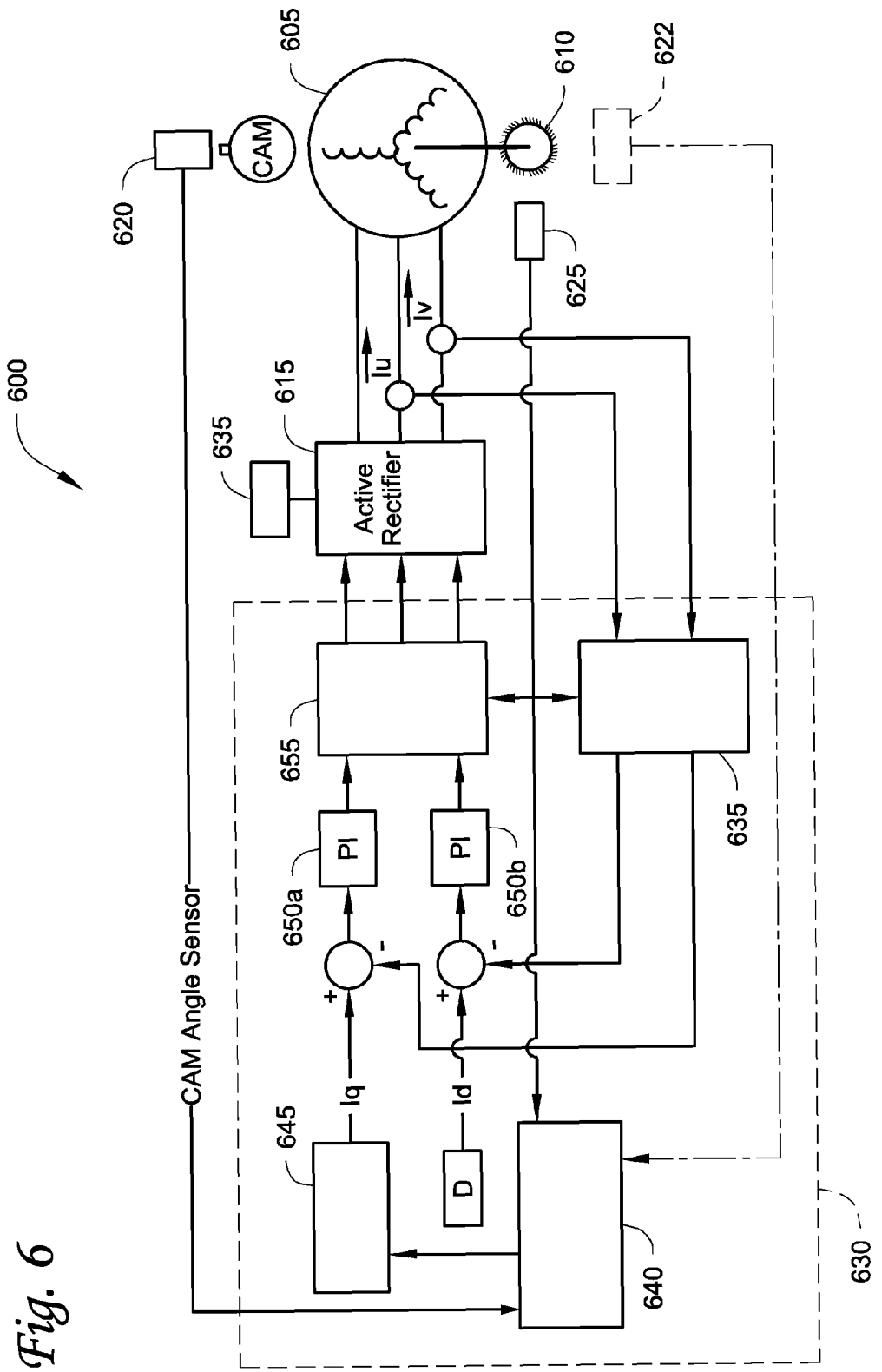
FIG. 6 is an illustration of a control architecture, for reducing vibrations felt by a system housing an engine.

These parameter values are fed into a control unit which determines at 520 when switching will occur by applying one or more control methodologies. For example, the control unit may determine optimal load switching by utilizing lookup tables and/or notch filters and/or an algorithm such as a PID-type algorithm. FIG. 6 provides one example of a control architecture using control methodologies to determine switching instructions. In some embodiments, the control unit also adjusts the DC bus voltage across the load to maintain the bus voltage within a predetermined band of values as energy is added and removed from a energy storage device.

The control unit then at 530 switches the electrical load on and off in accordance with the maximum region of torque input to the system through one of several control topologies shown in FIGS. 7a-7c.

FIG. 6 is an illustration of a control architecture 600, for reducing vibrations felt by a system housing an engine according to one embodiment. The control architecture 600 includes a machine 605 rigidly mounted to a flywheel 610 and coupled to an AC-to-DC rectifier 615, which controls the amount of current transferred from the machine 605 to a energy storage device 635 and a control unit 630. The machine 605 can be any number of machines including, but not limited to, a synchronous machine (i.e., a 3-phase permanent magnet synchronous machine ("PMSM"), a single phase machine, a wound field machine, etc.) or an asynchronous machine (i.e., an induction machine, etc.). The machine 605 can also be either a variable speed machine or a fixed speed machine. The energy storage device 635 can be one of any number of energy storage devices including, but not limited to, a capacitor (i.e., electro chemical capacitors, super-capacitors, ultra-capacitors, etc.), a battery (i.e., lead acid, lithium, lithium ion, nickel cadium, NiMH, etc.), a flow battery (i.e., reduction-oxidation, such as a vanadium redox flow battery, polysulfide bromide, cerium zinc, zinc bromide, uranium redox, etc.), an electrically driven flywheel storage system, etc. The architecture also includes a cam sensor 620 and a crank angle sensor 625 coupled to the control unit 630. The cam sensor 620 is used for sensing where in the engine cycle the engine is currently at and the crank angle sensor 625 for determining the current crank angle. In some embodiments, the cam sensor 620 is replaced with a flywheel sensor 622 that determines where in the engine cycle the engine is currently at by the combination of monitoring the speed feedback of teeth spacers 612 on the flywheel 610 and speed fluctuation.

The control unit 630 analyzes the engine torque in the frequency/order domain. The control unit 630 includes a transformation component 635 that receives current Iu and Iv, produced in two of three phases of electricity by the machine 605. The transformation component 635 transforms and isolates the AC current Iu and Iv into its torque component DC current Iq and its field component DC current Id. The control unit 630 also includes a torque cancellation component 640 that receives the output of the cam sensor 620 and the crank angle sensor 625.

The torque cancellation component 640 determines a canceling or reference torque amplitude and phase values for a speed range of interest. In some applications, only one mode of the total torque cancellation waveform is sufficient. In other applications, multiple modes of the torque cancellation waveform or the total torque cancellation waveform can be used for roll torque cancellation. The speed range of interest is determined from the current crank angle and location in the engine cycle the speed of the rotor in the machine 605.

In one embodiment, the torque cancellation component includes a table with values that are predetermined by studying the roll torque and calculating the dominant modes that require cancellation. Based on the speed of the rotor in the machine 605 and the current drawn by the load, the torque cancellation component 640 determines the dominant frequency F of the vibration felt by the system. Using this information, the torque cancellation component 640 provides an amplitude value A and a phase value P of a reference torque to be used to cancel the vibration. The frequency value F, amplitude value A and the phase value P for the reference torque determined by the torque cancellation component 640 are then sent to a torque adjustment component 645.

For example, for an odd fire twin cylinder engine, when the engine speed is at 1400 rpm and no current is drawn by the load, the dominant frequency F is 11.67 Hz. At 11.67 Hz, the torque cancellation component 640 will then determine a reference torque with amplitude A 23.3560 Nm and phase angle P −99.2516°. When the engine speed is at 2000 rpm and the current drawn by the load is 3.5 kW, the dominant frequency F is 16.67 Hz. At 16.67 Hz, the torque cancellation component 640 will then determine a reference P torque with the amplitude A of 50.2713 Nm and phase angle p of −89.973°.

In some embodiments, in order to compensate for variations in torque from one engine cycle to another the torque cancellation component 640 uses adaptive or optimal control techniques to modify the amplitude value A and the phase value P for the reference torque. For example, in some embodiments the table in the torque cancellation component 640 stores the amplitude and phase angle of the reference torque and uses these values to determine the amplitude and phase angle of the reference torque for the next engine cycle.

In other embodiments, torque cancellation component 640 uses a narrow band disturbance rejection technique. In these embodiments, a frequency band of dominant disturbance is determined by studying the transmitted vibration modes. The crank angle sensor 625 is used to feedback the modes that would reject the dominant disturbance band to the torque cancellation component 640. The torque cancellation component 640 then determines a narrow band of frequency that attenuates a dominant mode of the vibration created by the machine 605. By focusing on only the dominant mode of the vibration, the power rating required of the machine 605 to facilitate the negative torque can be reduced, thus optimizing the physical size of the machine 605 as well as the cost for the machine 605. It is known that the crank angle sensor 625 can be replaced with any other type of sensor or combination of sensors that measure the speed of the engine to feedback the modes that would reject the dominant disturbance band to the torque cancellation component 640.

The torque adjustment component 645 determines a torque reference current value Iq* to be applied to the torque component DC current Iq. For example, in one embodiment, the torque reference value is determined using the following formula:

$$Iq^* = A \cdot \text{cosine}(2\pi \cdot F \cdot t + P)/kt$$

where F, A and P are the torque reference frequency value, amplitude value and phase value obtained from the torque cancellation component 640, kt represents the torque constant of the machine 605, and t represents time. The torque component DC current Iq is then subtracted from the resulting torque reference current value Iq* and the result is sent to a proportional-integral controller ("PI") component 650a to be converted to a torque component DC voltage Vq. In this embodiment, the field component DC current Id is set to zero and the negative of the actual Id current is sent to a PI component 650b and converted to a field component DC voltage Vd. However, in other embodiments, the field component DC current Id could also be adjusted. By focusing on one or few frequency components in the torque adjustment component 645, the power rating required of the machine 605 to facilitate the negative torque can be reduced, thus optimizing the physical size of the machine 605 as well as the cost for the machine 605. The torque component DC voltage Vq and the field component DC voltage Vd are then sent to the modulation component 655.

The modulation component 655 receives the torque component DC voltage Vq and the field component DC voltage Vd and generates switching instructions to the rectifier 615. In some embodiments, the modulation component 655 generates switching instructions using a sinusoidal pulse width modulation technique. In other embodiments, the switching instructions are generated using a space vector modulation.

The rectifier 615 receives the switching instructions from the modulation component 655 and switches the electrical load on and off in accordance with the maximum region of torque input to the system. This allows current to be sent back to the machine 605 to provide reverse torque to the machine 605 to reduce vibrations to the system. In the embodiment shown in FIG. 6, the rectifier 615 is an active bi-directional rectifier as shown in FIG. 7a.

FIGS. 7a-7c, in general, shows block diagrams of three exemplar rectifiers. The leftmost portion of the figure shows a schematic of a 3 phase machine 10. The machine 10 can be any number of machines including, but not limited to, a 3-phase PMSM, or an induction machine. Each leg of the machine 10 is comprised of windings which produce current E, and each which has an associated impedance R and AC inductance L. The central portion of the three block diagrams shows the particulars of each rectifier 20, and the right portion 30 shows the bus voltage Vdc 32 across an energy storage device 34 and the load 36.

In a first set of embodiments the level of motoring or generating torque is controlled by turning on and off the rectifier 20 which is connected to the machine 10, FIGS. 7b and 7c. The rectifier 20 is a uni-directional rectifier where power is drawn at specific times in an engine cycle to an energy storage device or a brake resistor. The block diagram shown in FIG. 7b has AC inductors 702 on each of the three phase circuits Lac which add to the AC inductance L of each leg of the machine 10 windings respectively. AC inductors may or may not be required, depending upon the inductances of each of the three machine legs. Each leg or phase is connected in parallel at junction points 708 to produce the three phase power. The current direction of each leg is controlled by sets of diodes 704 and 706, one upstream and one downstream of each junction point 708. A separate parallel circuit contains a transistor 710 which is controlled by a modulation component (not shown) using either a pulse width modulation or a space vector modulation technique to switch power to load 36. FIG. 7c shows a similar setup, where a DC inductor Ldc 720 is used, instead of the three AC inductors Lac 702. Again, inductor Ldc 720 may not be required, depending upon the inductances of each of the three PMSM legs. In both FIGS. 7b and 7c, an increase in output filtering is required to maintain the DC bus voltage within the level required by the downstream inverter that produces regulated AC output.

In some embodiments a bidirectional inverter on the machine 10 output is used such that the machine 10 can produce torque to offset any negative engine torques resulting from internal friction and other forces, as described above (see FIG. 7a). FIG. 7a is similar to FIGS. 7b, where sets of transistors 730 and 734 in parallel with diodes 732 and 736, respectively, replace diodes 704 and 706, respectively, and the parallel leg containing transistor 710 is eliminated. These changes allow the rectifier 20 to utilize both directions of power flow within the system. Here, the rectifier 20 switches the direction of current flow in each leg of the machine 10 using either pulse width modulation or space vector modulation techniques. The rectifier 20 shown in FIG. 7a is similar to the rectifier 615 shown in FIG. 6.

In some embodiments the application of the active torque management concepts described above are also used for an engine that utilizes an internal counter rotating balance shaft. In addition to, for example, cylinder pressure and slider-crank masses that result in roll torque, the counter rotating balance shaft also contributes to some vibration modes. These vibration modes would also be reduced using the active torque cancellation techniques described above.

Figure 8:
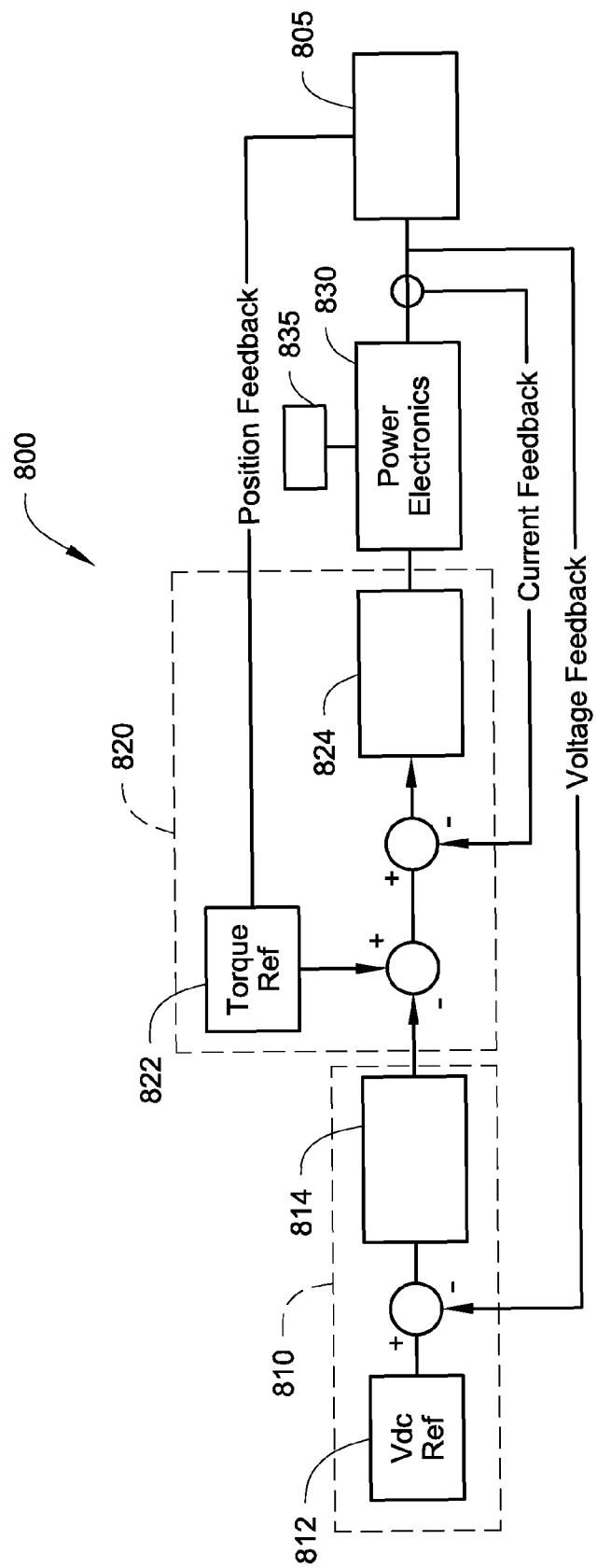
FIG. 8 is an illustration of a control architecture for reducing vibrations felt by a system housing an engine and adjusting the DC bus voltage across the load to maintain the bus voltage within a predetermined band of values as energy is added and removed from the energy storage device.

FIG. 8 is an illustration of a control architecture 800 for reducing vibrations felt by a system housing an engine and adjusting the DC bus voltage across the load to maintain the bus voltage within a predetermined band of values as energy is added and removed from the energy storage device, according to one embodiment. The control architecture 800 includes a machine 805 that is coupled to a voltage control unit 810, a torque control unit 820 and a power electronics unit 830. The machine 805 can be any number of machines including, but not limited to, a 3-phase PMSM, or an induction machine. The power electronics unit 830 is coupled to an energy storage device 835 that provides power to a load (not shown).

The voltage control unit 810 includes a voltage reference component 812 and a voltage control component 814. The voltage produced by the machine 805 is subtracted from a voltage reference Vdc provided by the voltage reference component 812 and the result is sent to the voltage control component 814. In some embodiments, the voltage reference Vdc is set to a constant value. In other embodiments, the voltage reference Vdc oscillates around a constant value to correspond with the torque canceling waveform. The voltage control component 814 converts the result to a DC bus voltage reference value. In some embodiments, the voltage control component 814 is a PI component. In other embodiments, the voltage control component 814 is a hysteresis control component.

The torque control unit 820 includes a torque reference component 822 and a torque control component 824. The torque reference component 822 receives position feedback of the machine 805 to determine a torque reference value. In some embodiments, the torque reference component 822 uses a table to determine the torque reference value such as the torque cancellation component 640 in FIG. 6. The torque reference value determined by the torque reference component 822 is added to the voltage reference value determined by the voltage control component 814 to obtain a total reference value. The current generated by the machine 805 is then subtracted from the total reference value and the result is sent to the torque control component 824. Using the result, the torque control component generates switching instructions to the power electronics unit 830. Based on the switching instructions, the power electronics unit 830 controls the power flow to provide reverse torque to the machine 805 to reduce vibrations to the system and also changes the DC bus voltage applied to a load in order to maintain the DC bus voltage within a range as energy is added and removed from the energy storage device 835.

It should be understood that even though these numerous characteristics and advantages of various embodiments have been set forth in the foregoing description, together with details of the structure and function of the embodiments, the disclosure is illustrative only, and changes may be made in detail, especially in matters of shape, size and arrangement of parts within the principals of the embodiments claimed in the appended claims to the full extent indicated by the broad general meaning of the terms in which the appended claims are expressed.

What is claimed is:

1. An active torque cancellation system, comprising:
    an engine driven generator set comprising a combustion engine and mounted to an application structure; and
    an active power management module coupled to the engine which actively reduces vibrations in the application structure, the active power management module including:
        a sensor;
        a torque control unit coupled to said sensor and configured to provide a switching signal to the rectifier;
        a rectifier configured to provide voltage to an energy storage device and configured to switch on and off by said switching signal to generate a negative torque to cancel torque generated by the generator set.

2. The system of claim 1, wherein the torque control unit comprises:
    a torque cancellation component coupled to the sensor and provides a torque reference value;
    a torque adjustment component coupled to the torque cancellation component that adjusts current generated by the generator set; and
    a modulation component coupled to the torque adjustment component that provides switching signals to the rectifier.

3. The system of claim 2, wherein the torque cancellation component includes a table for determining the torque reference value.

4. The system of claim 2, wherein the torque reference value is based on all modes of a total roll torque cancellation waveform.

5. The system of claim 2, wherein the torque reference value is based on less than all modes of a total roll torque cancellation waveform.

6. The system of claim 1, wherein the torque generated by the generator set is a roll torque from one or more of the following: a cylinder pressure variation, a slider-crank motion, and a counter rotating balance shaft.

7. The system of claim 1, wherein the rectifier is a uni-directional rectifier where power is drawn at specific times in an engine cycle to an energy storage device or a brake resistor.

8. The system of claim 1, wherein the rectifier is an active bi-directional rectifier.

9. The system of claim 1, wherein the active power management module further comprises a voltage control unit that adjusts the switching signal to maintain the voltage provided to the energy storage device between a minimum voltage value and a maximum voltage value.

10. The system of claim 1, wherein the sensor monitors where in the engine cycle the engine is currently at.

11. The system of claim 1, wherein the modulation component uses a pulse width modulation technique.

12. An engine driven generator set within a generator set housing comprising:
    a combustion engine;
    a machine which converts rotational energy into electrical energy and converts electrical energy into rotational energy;
    an active power management module that actively reduces vibrations in the generator set housing, the active power management module includes:
        a sensor;
        a torque control unit electrically connected to said sensor;
        a rectifier coupled to the torque control unit that is configured to switch on and off by said torque control unit to generate a negative torque reference to cancel torque generated by the generator set.

13. The generator set of claim 12, wherein the torque control unit comprises:
    a torque cancellation component coupled to the sensor and provides a torque reference value;
    a torque adjustment component coupled to the torque cancellation component that adjusts current generated by the generator set; and
    a modulation component coupled to the torque adjustment component that provides switching signals to the rectifier.

14. The system of claim 13, wherein the torque cancellation component includes a table for determining the torque reference value.

15. The system of claim 13, wherein the torque reference value is based on all modes of a total roll torque cancellation waveform.

16. The system of claim 13, wherein the torque reference value is based on less than all modes of a total roll torque cancellation waveform.

17. The generator set of claim 12, wherein the rectifier is an active bi-directional rectifier.

18. The generator set of claim 12, wherein the active power management module further comprises a voltage control unit that adjusts the switching signal to maintain the voltage provided to the energy storage device between a minimum voltage value and a maximum voltage value.

19. The generator set of claim 12, wherein the sensor monitors where in the engine cycle the engine currently is at.

20. The generator set of claim 12, wherein the modulation component uses a pulse width modulation technique.

21. A method for active reduction of vibration of an application structure mounting an engine driven generator set comprising:
    measuring engine control parameters of an engine of the generator set;
    using said measured control parameters to determine a torque cancellation waveform using an active power management module of the generator set; and
    generating a torque cancellation waveform to control an electrical load drawn from said generator set to reduce said vibration, wherein generating the torque cancellation waveform includes:
switching a rectifier of the active power management module on and off to provide reverse torque to the generator set and cancel torque generated by the generator set.

22. The method of claim 21 wherein:
said measuring generator control parameters include crank angle, current generated by the generator set and engine cycle position.

* * * * *